US012130569B2

(12) United States Patent
Watanabe et al.

(10) Patent No.: US 12,130,569 B2
(45) Date of Patent: Oct. 29, 2024

(54) TONER CARTRIDGE WITH A WALL HAVING OUTLETS THROUGH WHICH A PADDLE AND AN AUGER ARE REMOVABLE

(71) Applicant: Toshiba Tec Kabushiki Kaisha, Tokyo (JP)

(72) Inventors: Takaho Watanabe, Mishima Shizuoka (JP); Tadashi Sugiyama, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/157,675

(22) Filed: Jan. 20, 2023

(65) Prior Publication Data

US 2023/0408952 A1 Dec. 21, 2023

(30) Foreign Application Priority Data

May 17, 2022 (JP) ................................ 2022-080778

(51) Int. Cl.
*G03G 15/08* (2006.01)

(52) U.S. Cl.
CPC ..... *G03G 15/0891* (2013.01); *G03G 15/0875* (2013.01); *G03G 15/0889* (2013.01); *G03G 15/0894* (2013.01); *G03G 15/0896* (2013.01); *G03G 2215/00987* (2013.01); *G03G 2215/0668* (2013.01); *G03G 2221/1876* (2013.01)

(58) Field of Classification Search
CPC ........... G03G 15/0891; G03G 15/0894; G03G 15/0875; G03G 15/0889; G03G 15/0896; G03G 2221/1876; G03G 2215/00987; G03G 2215/0668; G03G 2215/068; G03G 2215/085; G03G 15/0879
See application file for complete search history.

(56) References Cited

U.S. PATENT DOCUMENTS 5,852,762 A * 12/1998 Hatta ................. G03G 15/0855 399/358
5,940,658 A * 8/1999 Yokoi ................ G03G 15/0822 399/256
6,088,561 A * 7/2000 Kawamura ........ G03G 15/0894 399/106
2002/0051664 A1* 5/2002 Aoki .................. G03G 15/0194 399/359
2014/0086640 A1 3/2014 Okabe
2018/0120735 A1* 5/2018 Kitagawa ........... G03G 15/0891

FOREIGN PATENT DOCUMENTS

JP 2000289314 A 10/2000
JP 2007024958 A 2/2007

* cited by examiner

*Primary Examiner* — Arlene Heredia
*Assistant Examiner* — Laura Roth
(74) *Attorney, Agent, or Firm* — Kim & Stewart LLP

(57) ABSTRACT

A toner cartridge includes a container for storing toner to be supplied to an image forming apparatus. The container extends in a longitudinal direction and includes two walls at ends thereof in the longitudinal direction. One of the walls has a first outlet. The toner cartridge includes a paddle rotatable between the walls of the container to stir the toner and removable from the container through the first outlet. The toner cartridge includes a first lid for covering the first outlet. The first lid has a first bearing hole through which an end of the paddle is rotatably held.

16 Claims, 9 Drawing Sheets

TONER CARTRIDGE WITH A WALL HAVING OUTLETS THROUGH WHICH A PADDLE AND AN AUGER ARE REMOVABLE

CROSS-REFERENCE TO RELATED APPLICATION(S)

This application is based upon and claims the benefit of priority from Japanese Patent Application No. 2022-080778, filed May 17, 2022, the entire contents of which are incorporated herein by reference.

FIELD

Embodiments described herein relate generally to a toner cartridge and an image forming apparatus.

BACKGROUND

A toner cartridge is mounted on and used in an image forming apparatus such as a digital multifunction peripheral (MFP). The toner stored in such a toner cartridge is supplied to a developing device of the image forming apparatus. After the toner is exhausted, the toner cartridge is removed from the image forming apparatus and reused. Before the toner cartridge is reused, the toner remaining in the toner cartridge is cleaned.

When the toner is filled into the toner cartridge, the toner is filled from a filling port provided at one end of the toner cartridge in the longitudinal direction. After the toner is filled, the filling port is sealed with a cap. On the other hand, when the residual toner in the toner cartridge is cleaned for reuse, for example, the cap of the filling port is removed, and air is sucked from the filling port, and the outside air is taken into the toner cartridge from a ventilation port provided on the opposite end in the longitudinal direction.

After the cleaning of the toner cartridge, the ventilation port is sealed with a lid, and the toner is filled from the filling port.

In the conventional toner cartridge described above, however, it is difficult to remove the toner adhering to its paddle or auger effectively by circulating air inside the toner cartridge.

SUMMARY OF THE INVENTION

Embodiments of the present invention provide a toner cartridge capable of effectively removing toner remaining therein for reuse.

In one embodiment, a toner cartridge for storing toner to be supplied to an image forming apparatus, includes a container in which the toner is stored, extending in a longitudinal direction, and including two walls at ends thereof in the longitudinal direction, one of the walls having a first outlet, a paddle configured to rotate between the walls of the container to stir the toner and removable from the container through the first outlet, and a first lid covering the first outlet and having a first bearing hole through which an end of the paddle is rotatably held.

DETAILED DESCRIPTION

Hereinafter, embodiments will be described in detail with reference to the drawings.

Figure 1:
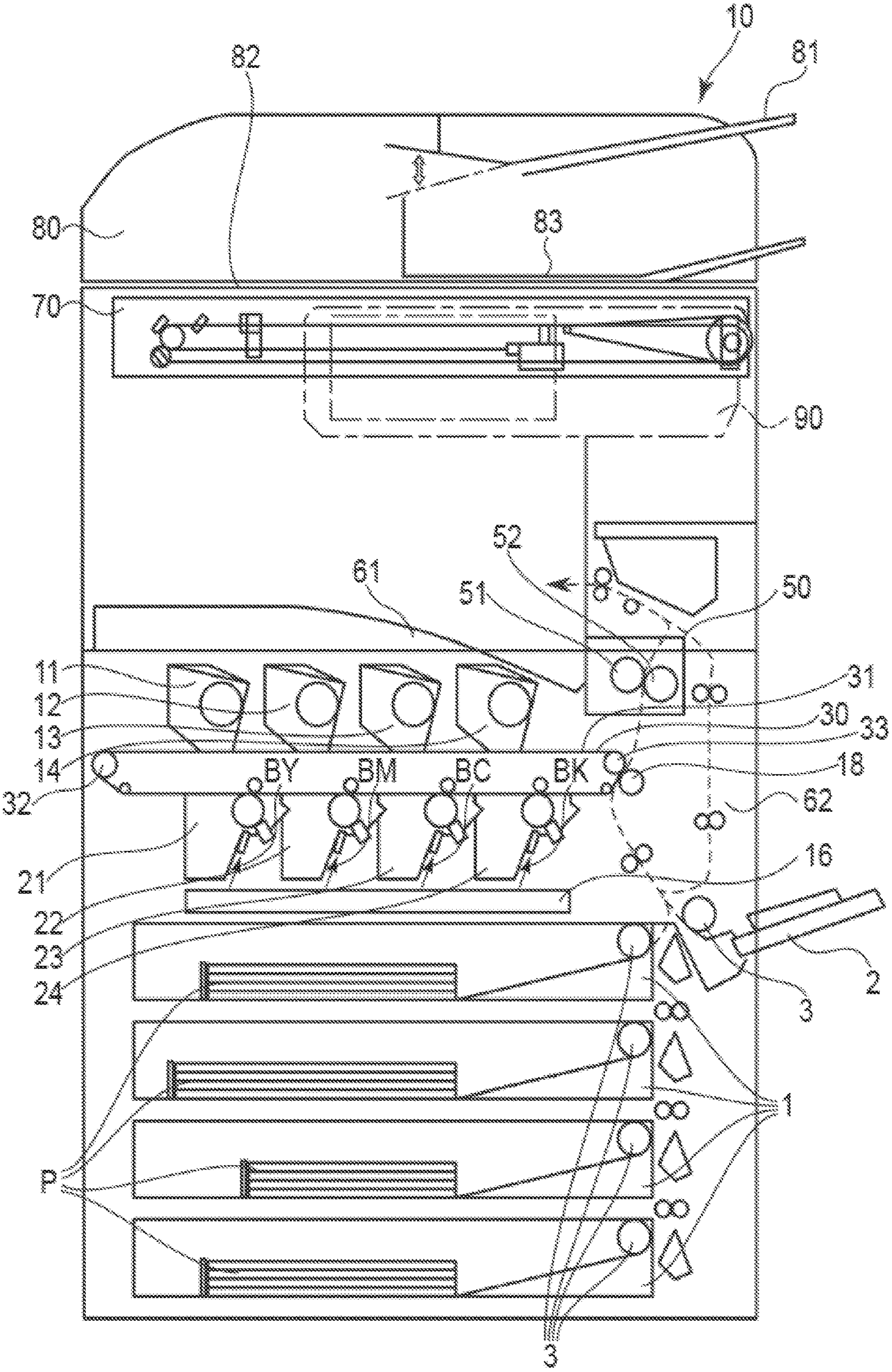
FIG. 1 is a schematic diagram illustrating a digital multifunction peripheral.

FIG. 1 illustrates a digital multifunction peripheral 10 in one embodiment, which is an example of an image forming apparatus. The digital multifunction peripheral 10 has many functions such as a printing function, a scanning function, a copying function, and a facsimile function. The printing function is a function of forming a toner image on a sheet. The scanning function is a function of reading an image from a document. The copying function is a function of printing the image read from a document using a scanning function on a sheet P using a printing function. The facsimile function is a function of printing an image based on data received using a communication line on a sheet P using a printing function, or transmitting image data read from a document using a scanning function via the communication line.

The digital multifunction peripheral 10 includes a plurality of sheet feed cassettes 1, a manual feed tray 2, and a plurality of sheet feed rollers 3. The sheet feed cassette 1 stores a plurality of sheets P used for printing. The manual feed tray 2 is used for manual feed in a state in which a plurality of sheets P are stacked. The sheet feed roller 3 takes out the sheets P stored in the sheet feed cassette 1 or placed on the manual feed tray 2 one by one.

The digital multifunction peripheral 10 includes a plurality of toner cartridges 11, 12, 13, and 14, a plurality of image forming units 21, 22, 23, and 24, an exposure device 16, a transfer belt unit 30, and a secondary transfer roller 18. The digital multifunction peripheral 10 includes the plurality of toner cartridges 11, 12, 13, and 14 above the transfer belt unit 30, and the plurality of image forming units 21, 22, 23, and 24 below the transfer belt unit 30.

The toner cartridges 11, 12, 13, and 14 contain toners of respective colors to be supplied to the image forming units 21, 22, 23, and 24. The left-most toner cartridge 11 in FIG. 1 contains yellow toner. The second toner cartridge 12 from the left contains toner of magenta. The third toner cartridge 13 contains cyan toner. The rightmost toner cartridge 14 contains black toner.

The toner cartridges 11, 12, 13, and 14 are detachable from the digital multifunction peripheral 10. The toner cartridges 11, 12, 13, and 14 have substantially the same structure except for the difference in the contained toner. Hereinafter, the toner cartridge 11 that contains yellow toner is mainly described, and the descriptions of the toner cartridges 12, 13, and 14 of the other colors will be omitted. The toner cartridge 11 will be described in detail later.

The image forming units 21, 22, 23, and 24 receive toner supplied from the toner cartridges 11, 12, 13, and 14, respectively, to form toner images of different colors. The leftmost image forming unit 21 in FIG. 1 forms a yellow (Y) toner image. The second from the left image forming unit 22 forms a toner image of magenta (M) color. The third from the left image forming unit 23 forms a cyan (C) toner image. The rightmost image forming unit 24 forms a black (K) toner image.

The image forming units 21, 22, 23, and 24 have substantially the same structure except for the difference in toner. Hereinafter, the yellow image forming unit 21 will be described as a representative, and the descriptions of the other color image forming units 22, 23, and 24 will be omitted.

Figure 2:
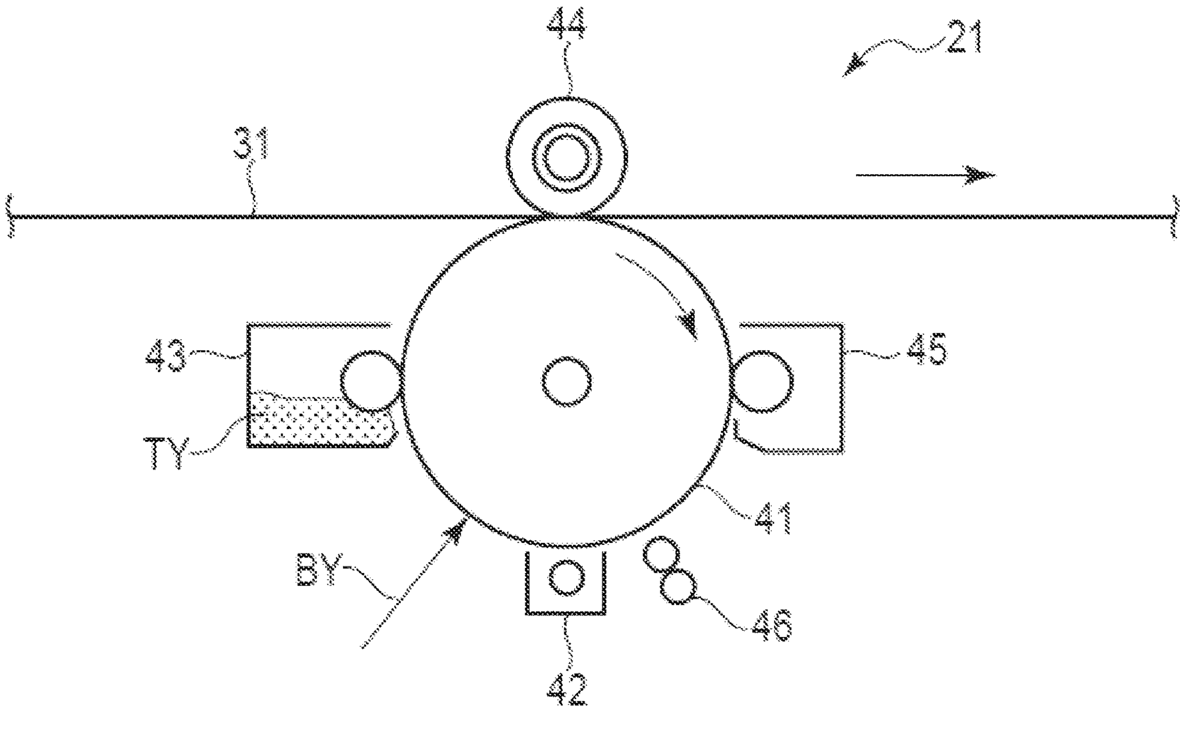
FIG. 2 is a schematic diagram illustrating an image forming unit of the digital multifunction peripheral.

As illustrated in FIG. 2, the image forming unit 21 that forms a yellow toner image includes a photoconductor drum 41, a charging unit 42, a developing device 43, a primary transfer roller 44, a cleaner 45, and a charge eliminating lamp 46. The image forming unit 21 includes the charging unit 42, the developing device 43, the primary transfer roller 44, the cleaner 45, and the charge eliminating lamp 46 arranged in this order in the rotation direction of the photoconductor drum 41 (i.e., the arrow direction inside the photoconductor drum 41 in FIG. 2) and facing the surface of the photoconductor drum 41.

The photoconductive drum 41 has a cylindrical surface that receives a light beam BY emitted from the exposure device 16. The light beam BY is emitted based on yellow image data obtained by color-separating image data read from a document by a scanner 70, which will be described later, or image data inputted from the outside of the digital multifunction peripheral 10. The exposure device 16 exposes and scans the surface of the photoconductor drum 41 with the light beam BY as the photoconductor drum 41 rotates, and forms an electrostatic latent image on the surface of the photoconductor drum 41 based on the yellow image data.

The charging unit 42 charges the surface of the photoconductor drum 41 before exposure to a predetermined potential. The developing device 43 develops the electrostatic latent image on the surface of the photoconductor drum 41 by the yellow toner TY supplied from the toner cartridge 11. That is, the developing device 43 supplies yellow toner to the surface of the photoconductor drum 41 to form a yellow toner image.

The primary transfer roller 44 faces the surface of the photoconductor drum 41 with the transfer belt 31 of the transfer belt unit 30 interposed therebetween. The primary transfer roller 44 generates a transfer voltage between itself and the photoconductor drum 41. By this transfer voltage, the primary transfer roller 44 transfers the yellow toner image formed on the surface of the photoconductor drum 41 to the surface of the transfer belt 31 in contact with the photoconductor drum 41 (i.e., primary transfer).

The cleaner 45 removes the yellow toner TY remaining on the photoconductor drum 41. The charge eliminating lamp 46 removes the charge remaining on the surface of the photoconductor drum 41.

The exposure device 16 illustrated in FIG. 1 irradiates the photoreceptor drums 41 of the image forming units 21, 22, 23, and 24 with light-beams BY, BM, BC, BK of respective colors in accordance with the color-separated image data of the respective colors. The light-beams BY, BM, BC, BK of the respective colors are for forming yellow, magenta, cyan, and black images, respectively.

For example, the exposure device 16 emits the yellow light beam BY in accordance with the yellow image data to form a yellow electrostatic latent image on the surface of the photoconductor drum 41 of the image forming unit 21. Similarly, the exposure device 16 emits the light-beams BM, BC, BK of three colors in accordance with the magenta color component, the cyan color component, and the black color component of the image data to form electrostatic latent images for magenta, cyan, and black on the surfaces of the photoconductor drums 41 of the image forming units 22, 23, and 24, respectively.

The transfer belt unit 30 includes an endless transfer belt 31 and two rollers around which the transfer belt 31 is wound. These two rollers are a driven roller 32 and a drive roller 33. In addition, the transfer belt unit 30 includes a tension roller for applying tension to the transfer belt 31. By rotating the drive roller 33, the transfer belt 31 rotates. The transfer belt 31 rotates in the counterclockwise direction in FIG. 1 to convey the toner images of the respective colors transferred from the image forming units 21, 22, 23, and 24 to the secondary transfer roller 18.

The secondary transfer roller 18 faces the surface of the drive roller 33 with the transfer belt 31 interposed therebetween, and generates a transfer voltage with respect to the drive roller 33. Due to this transfer voltage, the secondary transcription roller 18 transfers each colored toner image superimposed on the surface of the transfer belt 31 into a sheet P (i.e., secondary transcription) that has been supplied from the sheet feed cassette 1 or manual feed tray 2 and transported between the transfer belt 31 and the secondary transcription roll 18.

The digital multifunction peripheral 10 also includes a fixing device 50. The fixing device 50 heats and pressurizes the sheet on which the toner images of the respective colors have been transferred. As a result, the toner images of the respective colors transferred to the sheet P are fixed to the sheet P. The fixing device 50 includes a heating roller 51 and a pressing roller 52 that face each other with the conveyance path of the sheet P interposed therebetween.

The heating roller 51 includes a heat source for heating the heating roller 51. The heat source is, for example, a heater. The heating roller 51 heated by the heat source heats the sheet P to the melting temperature of the toner. The pressing roller 52 presses the sheet P passing between the pressing roller 52 and the heating roller 51.

The digital multifunction peripheral 10 also includes a sheet discharge tray 61, a duplex unit 62, a scanner 70, a document feeder 80, and a control panel 90.

The sheet discharge tray 61 receives the sheet P discharged after the printing is completed. The duplex unit 62 brings the sheet P into a state in which printing on the back surface is possible. For example, the duplex unit 62 switches back the sheet P by using a roller or the like, thereby reversing the front and back sides of the sheet P and feeding the sheet P to the secondary transfer region between the transfer belt 31 and the secondary transfer roller 18.

The scanner 70 reads an image from a document. The scanner 70 reads an image by an optical reduction method including an image sensor such as an image sensor (CCD (charge-coupled device)), for example. Alternatively, the scanner 70 reads an image using a close contact sensor (CIS (contact image sensor)) method including an image sensor such as an image sensor (CMOS (complementary metal-oxide-semiconductor)).

The document feeder 80 is also referred to as, for example, an ADF (auto document feeder). The document feeder 80 takes out documents (not shown) placed on the tray 81 one by one, and conveys the documents one by one through a document glass 82. The scanner 70 reads an image of the document conveyed onto the document glass 82.

The control panel 90 includes buttons, a touch panel, and the like for an operator of the digital multifunction peripheral 10 to operate. The touch panel is, for example, a stack of a display such as a liquid crystal display or an organic EL display and a pointing device. Therefore, the button and the touch panel function as an input device that accepts an operation by the operator of the digital multifunction peripheral 10. The display of the touch panel functions as a display device that notifies the operator of the digital multifunction peripheral 10 of various kinds of information.

Hereinafter, the toner cartridge 11 will be mainly described with reference to FIG. 3.

Figure 3:
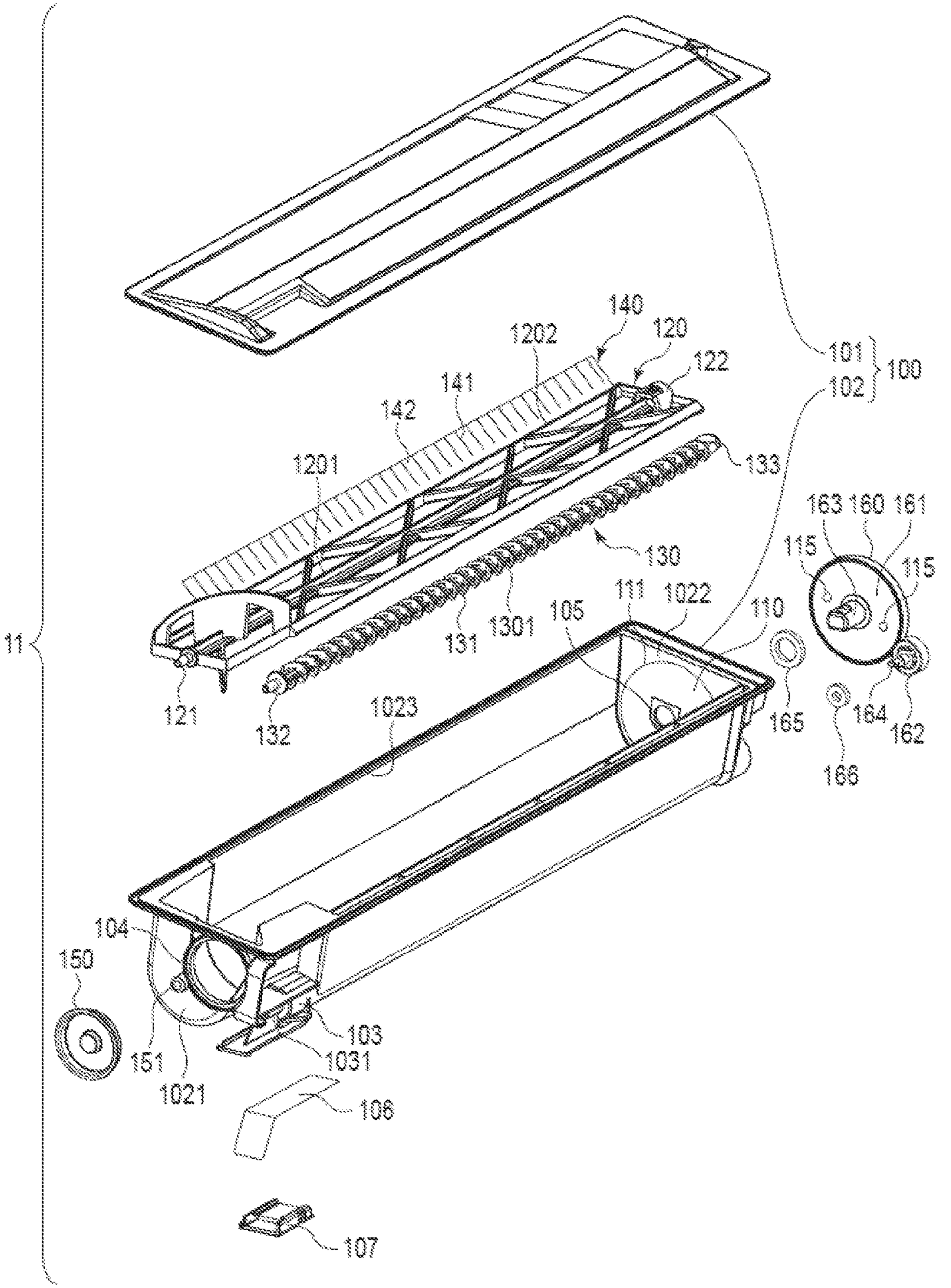
FIG. 3 is an exploded perspective view illustrating a toner cartridge according to an embodiment mounted on the digital multifunction peripheral.

As illustrated in FIG. 3, the toner cartridge 11 according to an embodiment includes a toner container 100, a paddle 120, and an auger 130. In the following description, the terms indicating directions and postures such as "front-rear" and "horizontal" are based on a state of the toner cartridge 11 after it has been attached to the digital multifunction peripheral 10.

The toner container 100 includes a container body 102 and a lid body 101. The container body 102 has a substantially U-shape in a cross section perpendicular to the longitudinal direction thereof. The container body 102 has a front wall 1021 perpendicular to the longitudinal direction at the front end thereof in the longitudinal direction, and has a rear wall 1022 perpendicular to the longitudinal direction at the rear end thereof in the longitudinal direction. Further, the container body 102 has a substantially rectangular opening 1023 that opens upwardly. The lid body 101 closes the opening 1023 of the container body 102. The lid body 101 has an upwardly convex roof shape. The toner container 100 in which the container body 102 and the lid body 101 are joined together has a box shape elongated in the front-rear direction.

A supply unit 103 having a supply port (not shown) for supplying toner to the developing device 43 is provided in front of a bottom portion of the container body 102. The supply port is a substantially rectangular hole opened below the supply unit 103. The supply port is sealed by a sealing material 106. The sealing material 106 is removed from the supply port when the toner cartridge 11 is used. The supply unit 103 includes a shutter 107 capable of opening and closing the supply port. A bearing portion 1031 is provided in front of the supply unit 103 to rotatably receive a front end 132 of a rotation shaft 1301 of an auger 130, which will be described later.

The front wall 1021 of the container body 102 includes a filling port 104 for filling the toner container 100 with toner. The filling port 104 is a circular hole that penetrates the front wall 1021. The filling port 104 is sealed by a cap 150 after the toner is filled. The cap 150 is attachable to and detachable from the filling port 104 of the container body 102. The cap 150 functions as a part of the front wall 1021 of the container body 102 when sealing the filling port 104.

The rear wall 1022 of the container body 102 includes an outlet 111 for removing the paddle 120. The outlet 111 is a circular hole that penetrates the rear wall 1022 of the container body 102. The outlet 111 has an inner diameter sized to allow the paddle 120 to be axially inserted therethrough. The outlet 111 has a female screw 113 (see FIG. 4) for screwing a substantially disk-shaped lid 110 to the inner peripheral surface thereof.

The lid 110 closes the outlet 111. The lid 110 has an outer diameter substantially the same as the inner diameter of the outlet 111. The lid 110 is attachable to and detachable from the outlet 111. The lid 110 has, on its outer peripheral surface, a male screw 112 (see FIG. 4) screwed into the female screw 113 on the inner peripheral surface of the outlet 111. The lid 110 can seal the outlet 111 by being screwed into the outlet 111, and functions as a part of the rear wall 1022 of the container body 102. The lid 110 has a bearing hole 105 into which the rear end of a rotation shaft 1201 of the paddle 120 is rotatably inserted. The bearing hole 105 penetrates the center of the lid 110.

The paddle 120 includes a rotation shaft 1201 and a stirring blade 1202. The stirring blade 1202 extends from the rotation shaft 1201 in a direction orthogonal to the rotation shaft 1201. The paddle 120 is disposed inside the toner container 100 in a posture in which the rotation shaft 1201 is aligned with the longitudinal direction of the toner container 100. The front end 121 of the rotation shaft 1201 is rotatably inserted into a bearing portion 151 provided on the front wall 1021 of the container body 102 adjacent to the filling port 104. The rear end of the rotation shaft 1201 includes a coupling portion 122. The paddle 120 rotates counterclockwise when viewed from the front. The paddle 120 rotates to stir the toner contained in the toner container 100.

The auger 130 includes a rotation shaft 1301 and a screw blade 131. The screw blade 131 extends spirally around the rotation shaft 1301. The auger 130 is disposed inside the toner container 100 in such a manner that the rotation shaft 1301 is adjacent to the paddle 120 along the longitudinal direction of the toner container 100. The front end portion of the auger 130 is disposed in the supply unit 103 of the toner container 100 above the supply port. The front end 132 of the rotation shaft 1301 is rotatably inserted into the bearing portion 1031 provided in the supply unit 103. The rear end of the rotation shaft 1301 includes a coupling portion 133. The auger 130 rotates to convey the toner between the screw blades 131 to the supply unit 103.

The paddle 120 includes a scraping member 140. The scraping member 140 is cantilevered on the opposite long side of the paddle 120 radially away from the rotation shaft 1201 of the stirring blade 1202. The scraping member 140 is an elastic rectangular sheet-like member. The scraping member 140 has substantially the same length as the stirring blade 1202 in the axial direction. The scraping member 140 has a plurality of slits 141 in a direction orthogonal to the rotation shaft 1201.

As the paddle 120 rotates, the free edge of the scraping member 140 opposite the stirring blade 1202 is pressed against and in sliding contact with the inner wall of the toner container 100. The scraping member 140 is deformed and curved with its free edge pressed against the inner wall of the toner container 100. The scraping member 140 moves in contact with the bottom of the inner wall of the toner container 100 as the paddle 120 rotates. As a result, the scraping member 140 feeds the toner toward the auger 130.

The toner cartridge 11 includes a gear unit 160 facing the outside of the rear wall 1022 of the container body 102 of the toner container 100. The gear unit 160 includes a paddle gear 161 connected to the rotation shaft 1201 of the paddle 120 and an auger gear 162 connected to the rotation shaft 1301 of the auger 130. The gear on the outer periphery of the paddle gear 161 and the gear on the outer periphery of the auger gear 162 are meshed with each other. Therefore, the auger gear 162 rotates in accordance with the rotation of the paddle gear 161. That is, the auger 130 is interlocked with the paddle 120.

The paddle gear 161 has a coupling shaft 163 protruding forward. The coupling shaft 163 is at the center of rotation of the paddle gear 161. The coupling shaft 163 is rotatably inserted into the bearing hole 105 provided in the lid 110 of the rear wall 1022 of the container body 102 in a state where a seal ring 165 formed of an elastic member is attached. The seal ring 165 seals a gap between the coupling shaft 163 of the paddle gear 161 and the bearing hole 105 to prevent toner leakage. The coupling shaft 163 is connected to the coupling portion 122 of the rotation shaft 1201 of the paddle 120. The coupling shaft 163 functions as one end of the rotation shaft 1201 of the paddle 120. The function of the seal ring 165 will be described in detail later.

The auger gear 162 has a coupling shaft 164 protruding forward. The coupling shaft 164 is at the center of rotation of the auger gear 162. The rear wall 1022 of the container body 102 includes a bearing hole (not shown) into which the coupling shaft 164 is rotatably inserted. The coupling shaft 164 is inserted into the bearing hole in a state where a seal ring 166 is attached. The coupling shaft 164 is connected to the coupling portion 133 of the rotation shaft 1301 of the auger 130.

Here, the procedure for assembling the above-described toner cartridge 11 will be described.

When assembling the toner cartridge 11, first, a supply port provided in the supply unit 103 of the container body 102 is sealed by the sealing material 106, and the shutter 107 is attached to the supply unit 103. Further, the lid 110 is screwed into the outlet 111 provided in the rear wall 1022 of the container body 102 to close the outlet 111.

Then, the paddle 120 and the auger 130 are set in the container body 102. At this time, the front end 132 of the rotation shaft 1301 of the auger 130 is inserted into the bearing portion 1031 provided in the supply unit 103 of the container body 102 from the inside, and the auger 130 is put into the container body 102. Further, the front end 121 of the rotation shaft 1201 of the paddle 120 is inserted into the bearing portion 151 provided on the front wall 1021 of the container body 102 from the inside, and the paddle 120 is put into the container body 102.

Next, the gear unit 160 is attached to the outside of the rear wall 1022 of the container body 102. At this time, the seal ring 165 is attached to the coupling shaft 163 of the paddle gear 161, and the coupling shaft 163 is inserted into the bearing hole 105 of the lid 110 attached to the rear wall 1022 of the container body 102. Then, the coupling shaft 163 of the paddle gear 161 is inserted into the coupling portion 122 provided at the rear end of the rotation shaft 1201 of the paddle 120 and is coupled therewith. In addition, the seal ring 166 is attached to the coupling shaft 164 of the auger gear 162, the auger gear 162 is engaged with the paddle gear 161, and the coupling shaft 164 of the auger gear 162 is inserted into the bearing hole of the rear wall 1022 of the container body 102. Further, the coupling portion 133 provided at the rear end of the rotation shaft 1301 of the auger 130 and the coupling shaft 164 of the auger gear 162 are coupled.

Finally, the lid body 101 is set so as to close the opening 1023 of the container body 102, and the container body 102 and the lid body 101 are joined by thermal welding along the entire periphery of the opening 1023. When the toner is filled in the toner cartridge 11 assembled as described above, the toner is filled from the filling port 104 of the front wall 1021 of the container body 102, and the cap 150 is attached to the filling port 104 to seal the filling port 104.

Next, a procedure for removing the lid 110 provided at the outlet 111 of the paddle 120 and a structure therefor will be described with reference to FIGS. 4 to 7.

When the toner cartridge 11 is reused, the toner remaining in the toner container 100 needs to be cleaned. At this time, the operator removes the lid 110 attached to the rear wall 1022 of the container body 102, and pulls out the paddle 120 from the toner container body 100 via the outlet 111. Then, the operator cleans the toner container 100 and the paddle 120 separately by blowing air to the inside of the toner container 100 and the paddle 120 which have been pulled out from the toner container 100.

Figure 4:
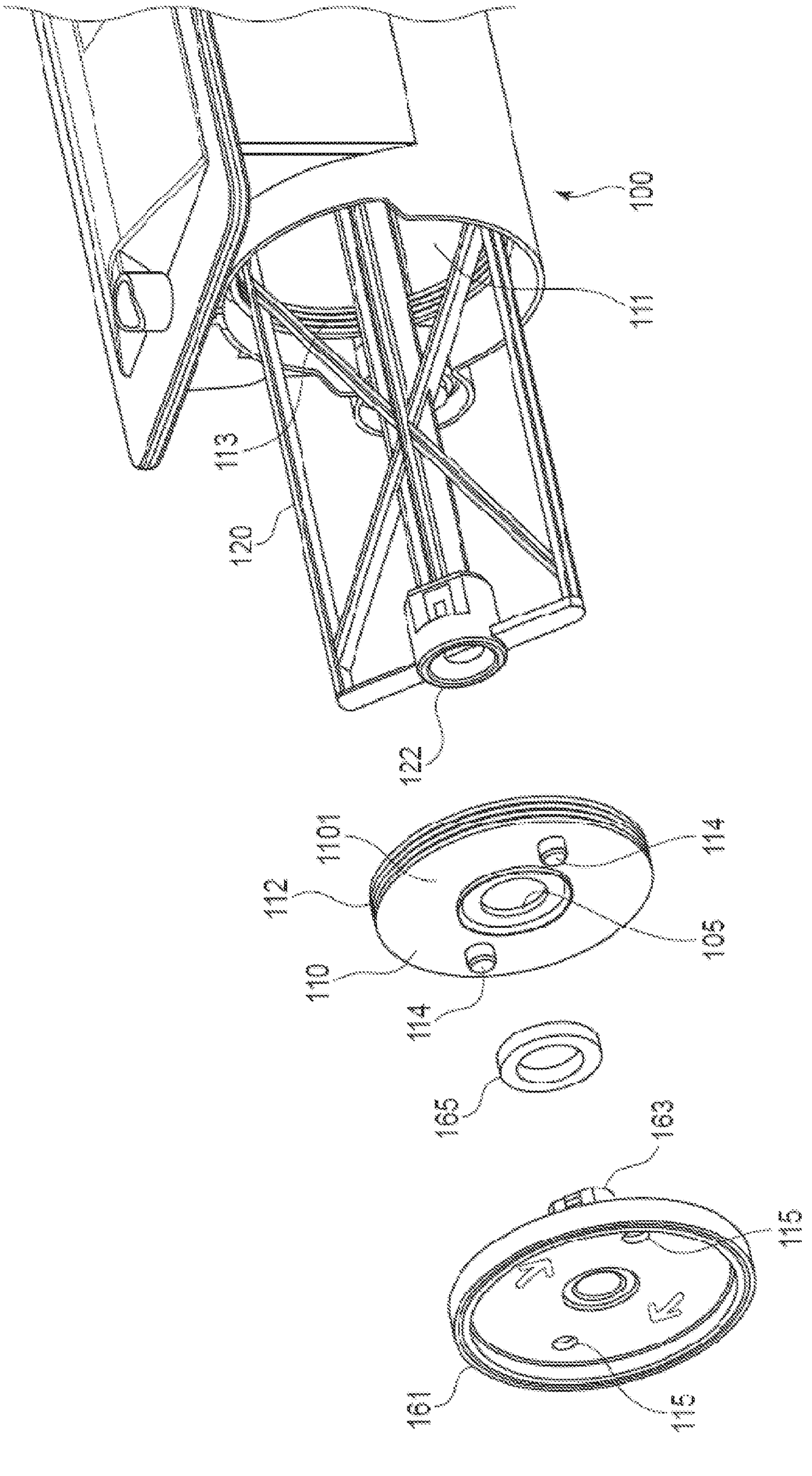
FIG. 4 is an exploded perspective view showing a part of the toner cartridge.

As shown in FIG. 4, the lid 110 has the male screw 112 on its outer peripheral surface. The outlet 111 of the toner container 100 has the female screw 113 on its inner peripheral surface. The lid 110 may be screwed into the outlet 111. When the outlet 111 is closed, the direction in which the lid 110 is rotated is the same as the rotation direction of the paddle 120. That is, the male screw 112 of the lid 110 and the female screw 113 of the outlet 111 are threaded such that the lid 110 is screwed into the outlet 111 in the same direction as the rotation direction of the paddle 120. In the present embodiment, this direction is a clockwise direction when the toner cartridge 11 is viewed from the rear. Conversely, when the lid 110 is removed from the outlet 111, the lid 110 may be rotated in the counterclockwise direction when viewed from the rear of the toner cartridge 11. By threading in this direction, rotation of the paddle 120 can prevent the lid 110 from rotating in a loosening direction.

The lid 110 is provided with two cylindrical dowels 114 (hereinafter also referred to as protrusions) at positions shifted from the center of the rear surface 1101 to opposite sides in the radial direction. The paddle gear 161 disposed coaxially with the lid 110 has two circular fitting holes 115 to which the two dowels 114 of the lid 110 are connected. The two dowels 114 and the two fitting holes 115 are in a positional relationship that can be arranged coaxially along the axial direction of the lid 110. Therefore, by rotating the paddle gear 161 with respect to the lid 110 attached to the rear wall 1022 of the toner container 100, the two fitting holes 115 of the paddle gear 161 can be aligned with the two dowels 114 of the lid 110.

Figure 5:
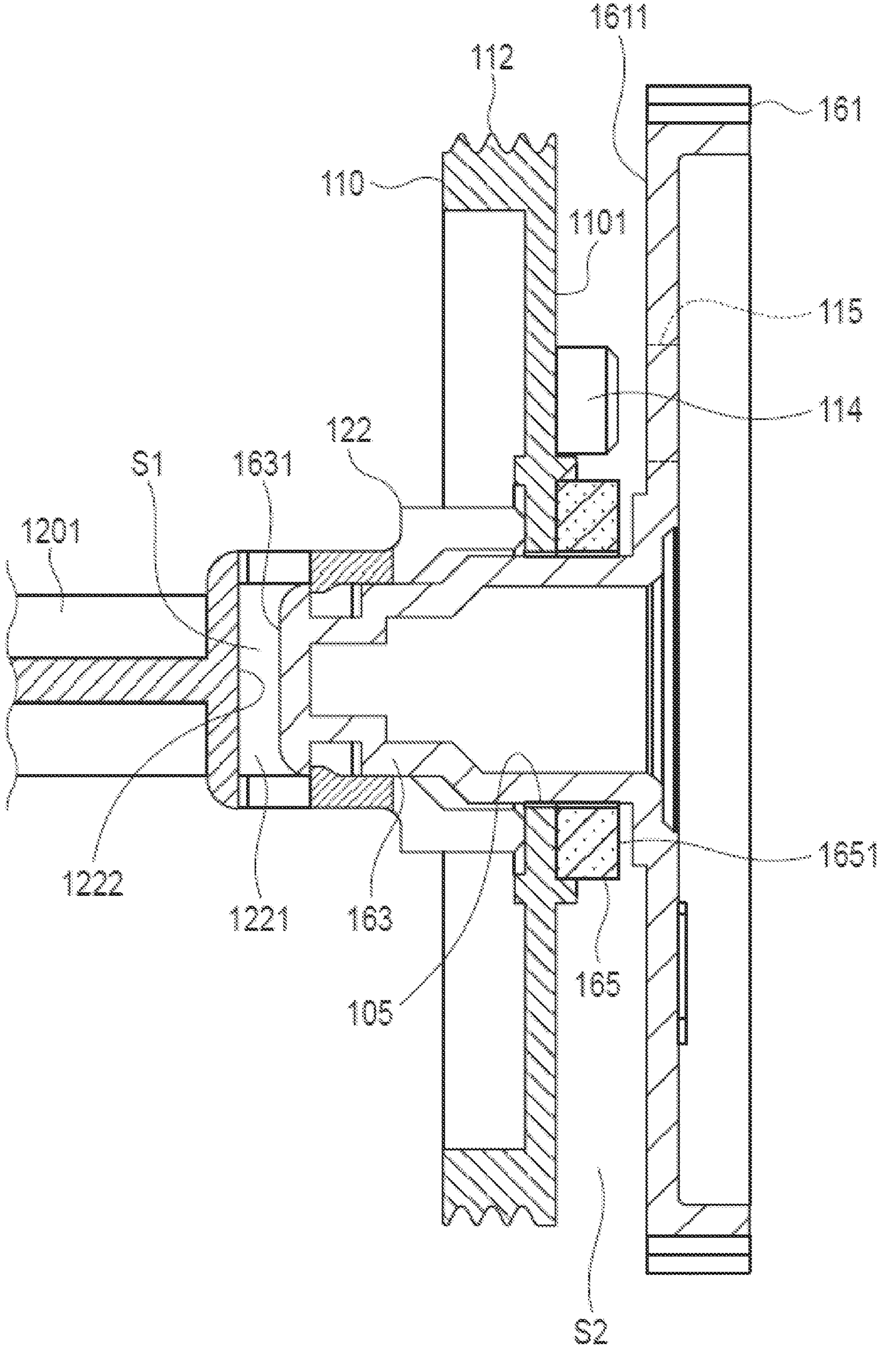
FIG. 5 is a cross-sectional view of the part of the toner cartridge.

As shown in FIG. 5, the paddle gear 161 is attached to the lid 110 by inserting the coupling shaft 163 into the bearing hole 105 of the lid 110 after the seal ring 165 is attached to the coupling shaft 163. Then, the coupling shaft 163 of the paddle gear 161 protruding forward through the bearing hole 105 of the lid 110 and the coupling portion 122 provided at the rear end of the rotating shaft 1201 of the paddle 120 are connected.

In this condition, there is an axial gap S1 between the front end 1631 of the coupling shaft 163 of the paddle gear 161 and the bottom surface 1222 of the receiving hole 1221 of the coupling portion 122 of the rotating shaft 1201 of the paddle 120. There is also an axial gap S2 between the front surface 1611 of the paddle gear 161 and the rear surface 1101 of the lid 110. Therefore, the paddle gear 161 can be pushed in the axial direction with respect to the lid 110 against the elastic force of the seal ring 165.

The width of the gap S2 between the paddle gear 161 and the lid 110 in the axial direction is generally determined by the thickness of the sealing ring 165 mounted on the coupling shaft 163 of the paddle gear 161. That is, by increasing the axial thickness of the sealing ring 165, the gap S2 can be sufficiently increased. In the present embodiment, the thickness of the sealing ring 165 is selected such that the protruding height at which the two dowels 114 protrude rearward from the rear surface 1101 of the cover 110 is lower than the width of the gap S2 while the paddle gear 161 is pushed in (not shown). In the present embodiment, a slight gap is also provided between the rear surface 1651 of the seal ring 165 and the paddle gear 161, and backlash is provided between them.

Figure 6:
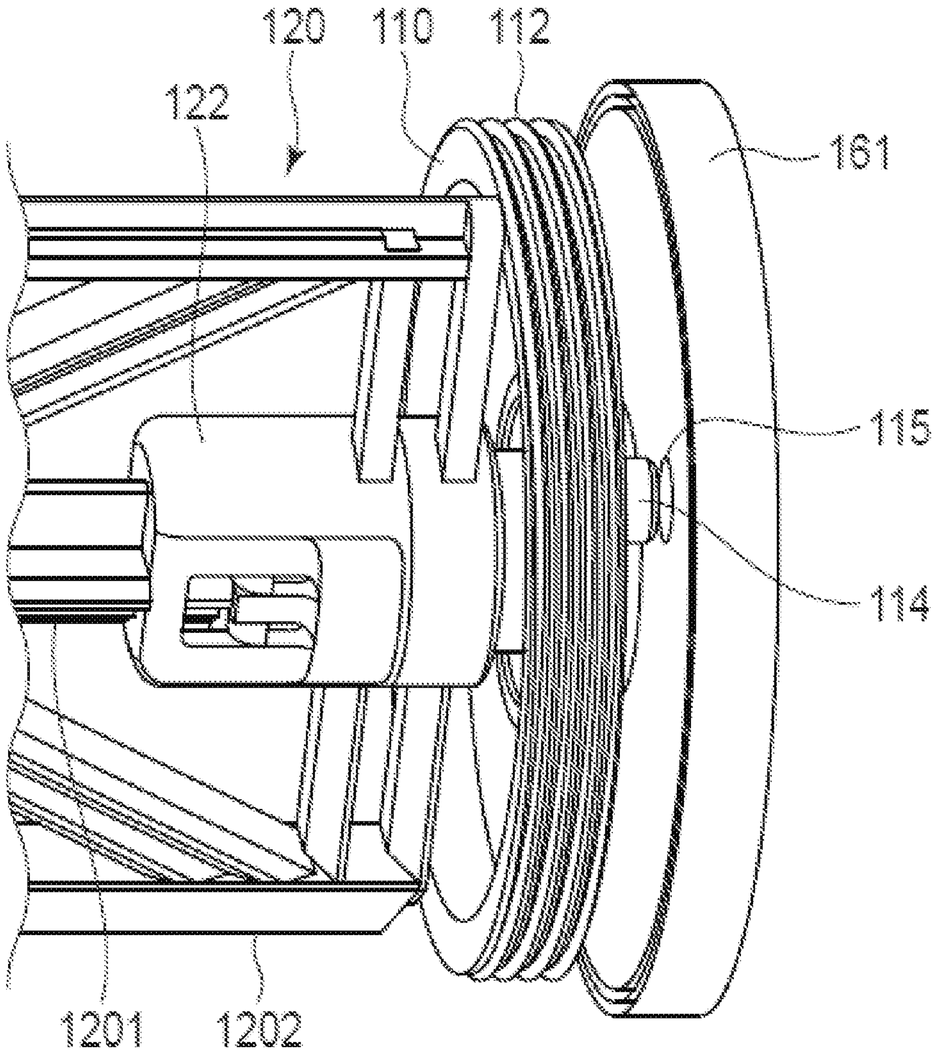
FIG. 6 is a perspective view illustrating the toner cartridge before a paddle gear shown in FIG. 5 is pushed thereinto.
Figure 7:
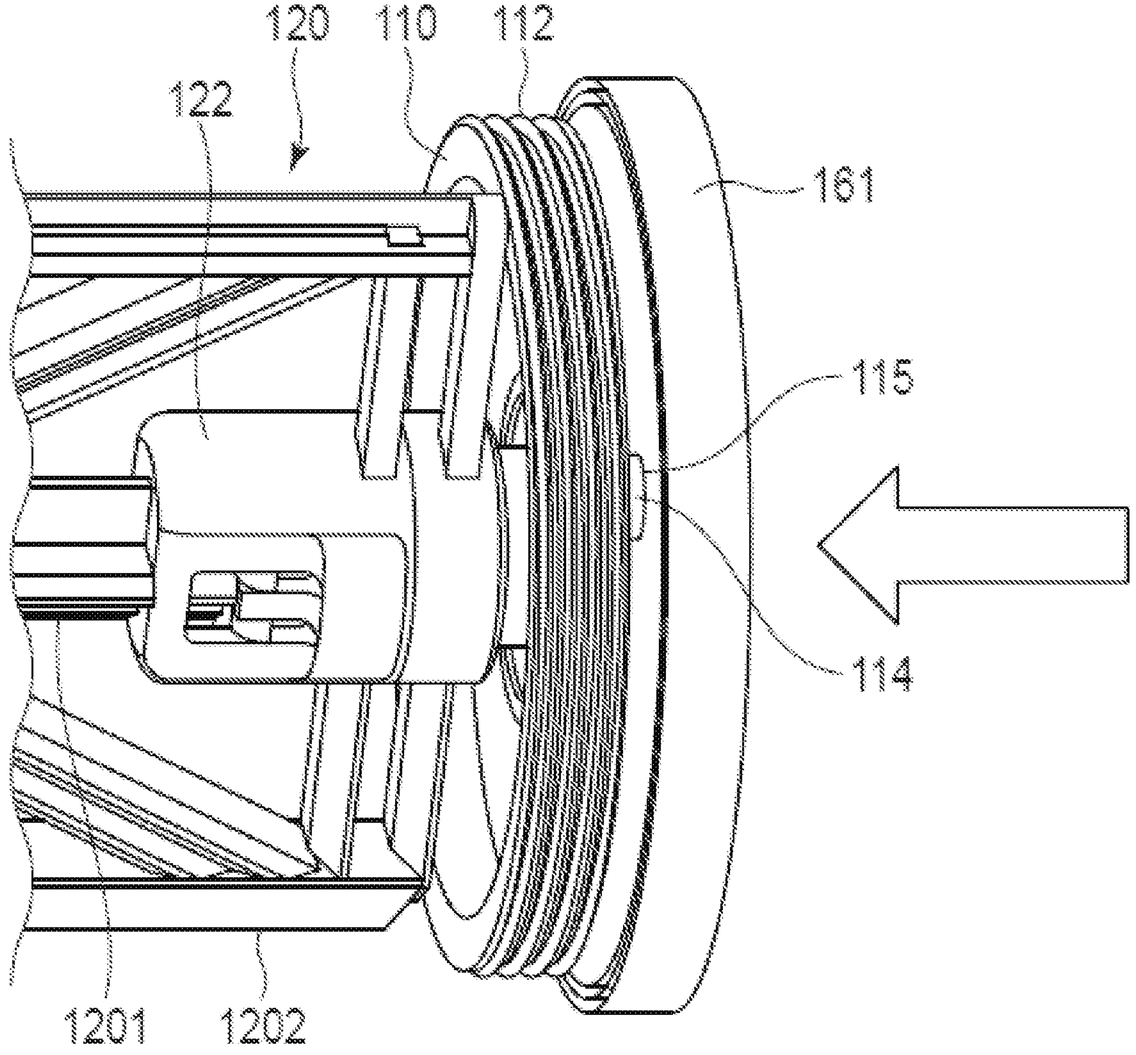
FIG. 7 is a perspective view illustrating the toner cartridge into which the paddle gear has been pushed.

When the lid 110 is removed from the outlet 111 of the toner container 100, as shown in FIG. 6, the operator first turns the paddle gear 161 such that the two dowels 114 of the lid 110 face the two fitting holes 115 (only one of which is shown) of the paddle gear 161. Then, the operator pushes the paddle gear 161 toward the lid 110 in the axial direction indicated by an arrow in FIG. 7 so that the two dowels 114 are inserted into the two fitting holes 115. In this state, the operator rotates the paddle gear 161 to rotate the lid 110 integrated with the paddle gear 161, and removes the lid 110 from the outlet 111 of the toner container 100.

As described above, according to the present embodiment, since the outlet 111 provided in the rear wall 1022 of the toner container 100 can be opened and closed by the lid 110, the paddle 120 can be pulled out from the toner container 100 through the outlet 111 when the toner cartridge 11 is reused. Therefore, the toner adhering to the paddle 120 drawn out from the toner container 100 can be removed effectively, and the cleaned paddle 120 can be attached to the inside of the toner container 100 through the outlet 111.

Further, according to the present embodiment, since the outlet 111 for taking out the paddle 120 is provided in the rear wall 1022 of the toner cartridge 11, the lid 110 is not inadvertently removed in a state where the toner cartridge 11 is attached to the digital multifunction peripheral 10. Further, since the lid 110 needs to be rotated with respect to the outlet 111 when removed, even in a state in which the toner cartridge 11 is not attached to the digital multifunction peripheral 10, the lid 110 is not inadvertently removed from the outlet 111.

Further, according to the present embodiment, since the rotation direction of the lid 110 when the lid 110 is removed from the outlet 111 is opposite to the rotation direction of the paddle 120, the lid 110 is not loosened by the rotation of the paddle 120 when the toner cartridge 11 is used. Further, according to the present embodiment, when the lid 110 is removed, the lid 110 can be rotated integrally with the paddle gear 161 by pushing the paddle gear 161 in alignment with the lid 110. As a result, the work of removing the lid 110 can be simplified and the workability can be improved.

In addition to the paddle 120, the toner cartridge 11 of the above-described embodiment includes the auger 130 from which the attached toner cannot be removed easily. Since the surface of the paddle 120 and the auger 130 is uneven, it is difficult to clean the toner adhering to the depression. Therefore, in order to clean the toner cartridge 11 for reuse, it is desirable to remove the auger 130 from the toner container 100 and clean it in the same manner as the paddle 120.

Figure 8:
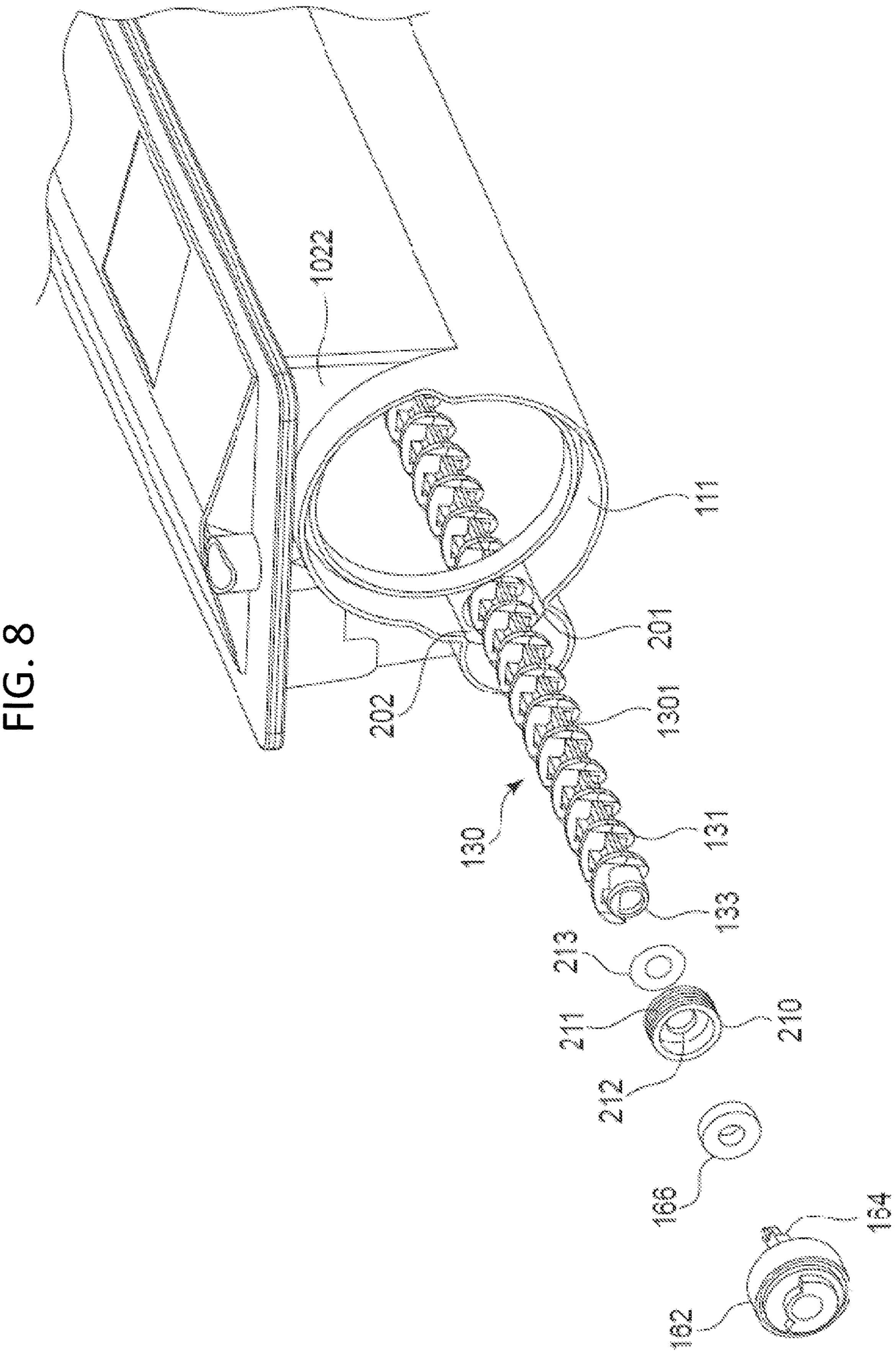
FIG. 8 is an exploded perspective view for explaining a toner cartridge in a modification example.

FIG. 8 is an exploded perspective view of a part of a modified example of the toner cartridge 11 described above. The toner cartridge 11 according to this modification includes an outlet 201 for taking out the auger 130 from the rear wall 1022 of the toner container 100. That is, the rear wall 1022 includes the outlet 201 for taking out the auger 130 in addition to the outlet 111 described above for taking out the paddle 120. In FIG. 8, the paddle 120 and the paddle gear 161 are not illustrated for ease of explanation.

On the inner peripheral surface of the outlet 201, there is a female screw 202 for screwing a lid 210. On the outer peripheral surface of the lid 210, there is a male screw 211 screwed into the female screw 202 of the outlet 201. The lid 210 is threadedly attached to the outlet 201 to close the outlet 201, and functions as a part of the rear wall 1022. The lid 210 has a bearing hole 212 into which the coupling shaft 164 of the auger gear 162 is inserted.

When the auger gear 162 is attached, the seal ring 166 is attached to the coupling shaft 164 of the auger gear 162, and the coupling shaft 164 is inserted into the bearing hole 212 of the lid 210 screwed into the outlet 201 of the rear wall 1022 of the toner container 100. At this time, a washer 213 is disposed between the lid 210 and the connecting portion 133 of the auger 130. Then, the coupling shaft 164 of the auger gear 162 is coupled with the coupling portion 133 of the auger 130.

Figure 9:
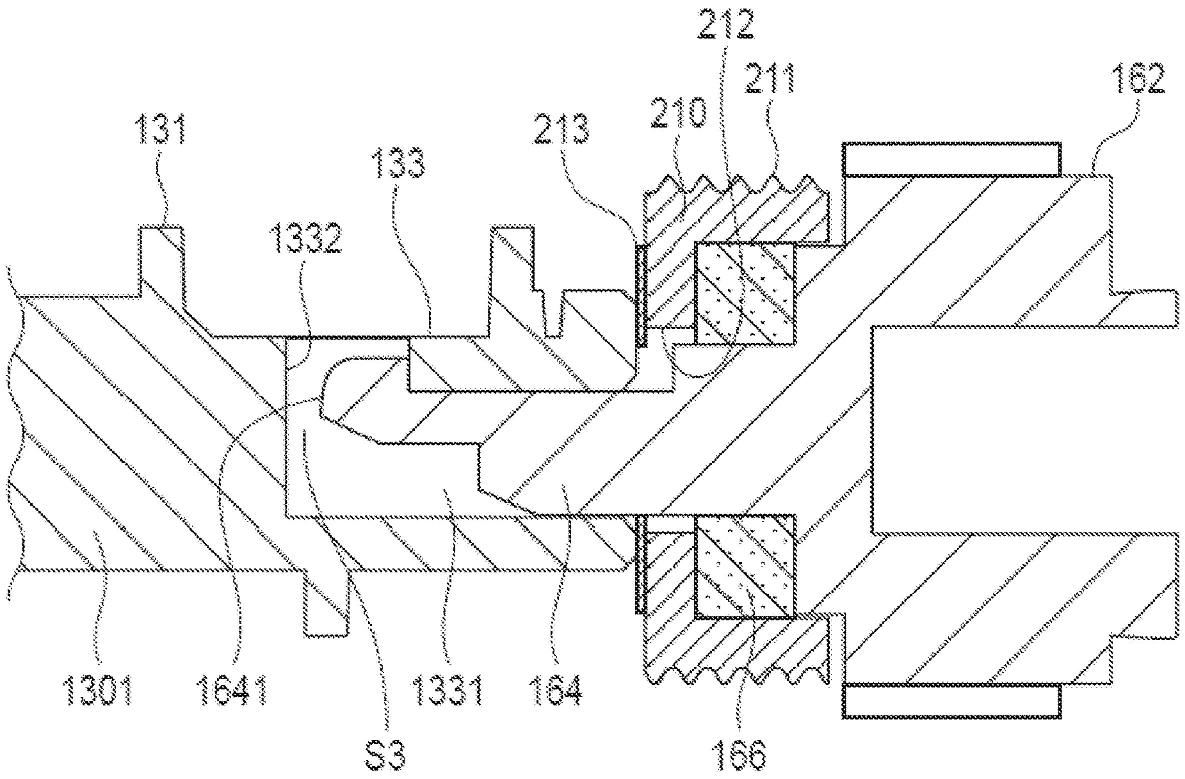
FIG. 9 is a cross-sectional view showing a part of the toner cartridge shown in FIG. 8.

As shown in FIG. 9, with the auger gear 162 attached, there is an axial gap S3 between the front end 1641 of the connecting shaft 164 of the auger gear 162 and the bottom surface 1332 of the receiving bore 1331 of the connecting portion 133 of the auger 130. On the other hand, there is no gap in front and rear of the seal ring 166 attached to the coupling shaft 164. Therefore, the auger gear 162 can be pushed forward in the axial direction with the elastic deformation of the seal ring 166 from the illustrated state.

Between the lid 210 and the auger gear 162, there is a dowel and a fitting hole (not shown here) which function similarly to the above-described embodiment. Therefore, by rotating the auger gear 162 in a state in which the auger gear 162 is pushed against the restoring force of the seal ring 166 and the dowel and the fitting hole are connected to each other, the lid 210 can be rotated, and the lid 210 can be removed from the outlet 201.

As described above, according to the modified example, when the toner cartridge 11 is reused, the lid 210 can be removed from the outlet 201, the auger 130 can be pulled out from the toner container 100 for cleaning. As a result, the toner adhered to the auger 130 can be removed effectively.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

For example, in the embodiment and the modification described above, a gear and a lid are engaged by a dowel and a fitting hole. Alternatively, the gear and the lid may be engaged using a wedge-shaped protrusion and a fitting hole which are rotatably engaged. In addition, the number of bosses and fitting holes is not limited to two, and at least one set may be used. In addition, without providing a boss or a wedge-shaped protrusion, a lower hole coaxial with the fitting hole of the gear may be provided on the outer surface side of the lid, and the gear and the lid may be rotated integrally by inserting a dedicated tool.

Further, in the above-described embodiment, the ink cartridge 11 has the mounting structure for screwing a lid to a fitting hole has been described. Alternatively, the ink cartridge 11 may have a structure in which the lid is press-fitted to a through hole as long as the lid can seal the hole and be removed therefrom.

What is claimed is:

1. A toner cartridge for storing toner to be supplied to an image forming apparatus, comprising:
- a container in which the toner is to be stored, extending in a longitudinal direction, and including two walls at ends thereof in the longitudinal direction, one of the walls having a first outlet and a second outlet;
- a paddle rotatable about a first axis that extends between the walls of the container to stir the toner and removable from the container through the first outlet;
- a first lid for covering the first outlet, the first lid having a first bearing hole through which an end of the paddle is rotatably held;
- an auger including a screw blade, rotatable about a second axis that extends between the walls of the container to feed the toner towards a supply port of the container through which the toner is supplied to the image forming apparatus, and removable from the container through the second outlet; and
- a second lid for covering the second outlet, the second lid having a second bearing hole through which an end of the auger is rotatably held, wherein
- the supply port is at one of the ends of the container opposite to said one of the walls having the first and second outlets.

2. The toner cartridge according to claim 1, wherein each of the first outlet and the first lid has a circular shape, and the first lid is screwed into the first outlet about an axis that is coaxial with the first axis.

3. The toner cartridge according to claim 2, wherein the first lid is screwed into threads formed on said one of the walls around the first outlet, by being rotated in a direction that is identical to a rotation direction of the paddle for stirring the toner.

4. The toner cartridge according to claim 1, further comprising:
- a first gear connected to the paddle through the first bearing hole of the first lid, by which a rotation force is transmitted to the paddle, and having one or more fitting holes; and
- an elastic seal ring between the first lid and the first gear, wherein
- the first lid includes one or more protrusions, each of which fits into a corresponding one of the fitting holes when the seal ring is deformed.

5. The toner cartridge according to claim 4, wherein said one or more fitting holes include two fitting holes arranged along a line that extends through a rotation axis of the gear.

6. The toner cartridge according to claim 4, wherein the first gear has a diameter greater than a diameter of the first lid.

7. The toner cartridge according to claim 1, wherein the other of the walls of the container has a filling port through which the toner can be filled.

8. The toner cartridge according to claim 7, further comprising:
- a cap that fits in the filling port to seal the container.

9. An image forming apparatus, comprising:
- an image forming unit configured to form an image of toner on a belt;
- a fixing device configured to fix on a sheet the image transferred through the belt; and
- a toner cartridge including:
  - a container in which the toner is to be stored, extending in a longitudinal direction, and including two walls at ends thereof in the longitudinal direction, one of the walls having a first outlet and a second outlet,
  - a paddle rotatable about a first axis that extends between the walls of the container to stir the toner and removable from the container through the first outlet,
  - a first lid for covering the first outlet, the first lid having a first bearing hole through which an end of the paddle is rotatably held,
  - an auger including a screw blade, rotatable about a second axis that extends between the walls of the container to feed the toner towards a supply port of the container through which the toner is supplied to the image forming unit, and removable from the container through the second outlet, and
  - a second lid for covering the second outlet, the second lid having a second bearing hole through which an end of the auger is rotatably held, wherein
  - the supply port is at one of the ends of the container opposite to said one of the walls having the first and second outlets.

10. The image forming apparatus according to claim 9, wherein each of the first outlet and the first lid has a circular shape, and the first lid is screwed into the first outlet about an axis that is coaxial with the first axis.

11. The image forming apparatus according to claim 10, wherein the first lid is screwed into threads formed on said one of the walls around the first outlet, by being rotated in a direction that is identical to a rotation direction of the paddle for stirring the toner.

12. The image forming apparatus according to claim 9, wherein
- the toner cartridge further includes:
  - a first gear connected to the paddle through the first bearing hole of the first lid, by which a rotation force is transmitted to the paddle, and having one or more fitting holes, and
  - an elastic seal ring between the first lid and the first gear, and
- the first lid includes one or more protrusions, each of which fits into a corresponding one of the fitting holes when the seal ring is deformed.

13. The image forming apparatus according to claim 12, wherein said one or more fitting holes include two fitting holes arranged along a line that extends through a rotation axis of the gear.

14. The image forming apparatus according to claim 12, wherein the first gear has a diameter greater than a diameter of the first lid.

15. The image forming apparatus according to claim 9, wherein the other of the walls of the container has a filling port through which the toner can be filled.

16. The image forming apparatus according to claim 15, wherein the toner cartridge further includes a cap that fits in the filling port to seal the container.

* * * * *